United States Patent Office
2,838,367
Patented June 10, 1958

2,838,367

U-EXTRACTION—IMPROVEMENTS IN ELIMINATION OF Mo BY USE OF FERRIC ION

Herbert M. Clark, Troy, N. Y., and Dick Duffey, La Fontaine, Ind., assignors to the United States of America as represented by the United States Atomic Energy Commission No Drawing. Application June 8, 1948
Serial No. 31,834

8 Claims. (Cl. 23—14.5)

This invention relates to the purification of uranium and more particularly to the separation of uranium from molybdenum.

An efficient process for the purification of uranium is the solvent extraction process whereby uranium values may be extracted by a water immiscible organic solvent from an aqueous solution of uranyl nitrate. By this process the uranium may be separated substantially completely from most other substances since the uranium has a greater solubility in the organic solvent than the contaminating materials. However, it has been found that molybdenum in the presence of phosphate ions, which are often present in the solution, especially when the solution is one obtained by acid digestion of a uranium containing ore, appears to form a complex with the phosphate which extracts along with the uranium values.

It is an object of the present invention to provide a process for the separation of uranium from molybdenum.

It is a further object to provide an organic solvent extraction process for the separation of uranium from molybdenum. Other objects will become apparent from the following description of the invention.

By the process of the present invention uranium values may be separated from molybdenum values by extracting the uranium values with a water immiscible organic solvent from an aqueous solution of uranyl nitrate and molybdenum values to which has been added ferric ions.

The concentration of uranium in the solution may vary within wide limits. For example, the extraction may be carried out by contacting the uranyl nitrate in the solid phase, in which phase it exists with six molecules of water of hydration per molecule, viz., $UO_2(NO_3)_2 \cdot 6H_2O$, with the organic solvent whereby the water of hydration of the uranyl nitrate forms the aqueous phase; or the extraction may be carried out by contacting with the organic solvent a solution wherein the uranyl nitrate is in tracer amounts. In general, however, the amount of molybdenum which extracts in proportion to the amount of uranium extracted increases in amount as the concentration of uranyl nitrate in the original aqueous phase increases. Consequently it is desirable to keep the concentration of the $UO_2(NO_3)_2$ as low as practical consistent with the other factors which must be considered for an efficient process. A suitable solution usable in the process of the present invention is a solution containing approximately 350 grams of $UO_2(NO_3)_2$ per liter of solution.

The addition of salting out agents to the aqueous phase prior to contacting with the organic solvent increases the distribution coefficient, that is, the ratio of uranium in the organic solvent phase to that remaining in the aqueous phase after contacting the aqueous phase with the water immiscible organic solvent. Suitable salting out agents include sodium nitrate, calcium nitrate, copper nitrate and aluminum nitrate.

Suitable organic solvents include any of the known water immiscible organic solvents showing a selective ability to dissolve uranium values. A few examples of such solvents are methyl isobutyl ketone, dibutyl carbitol, dibutyl cellosolve and diethyl ether; the latter being a particularly suitable solvent for the process of the present invention.

The extraction may be carried out by contacting the aqueous phase with the solvent in a batch process or by a continuous counter current extraction process. In either case it has been found that efficient extraction of the uranium may be obtained by contacting the aqueous phase with a volume of organic solvent totaling approximately six times the volume of aqueous solution.

Variations of the $HNO_3$ concentration of the aqueous feed solution and the extracting ether were found to have a complex effect upon the extraction ratio of Mo/U. In addition to the effect of the acid concentration upon the Mo/U extraction ratio is the effect of the acid concentration in the organic solvent upon the mechanical operation of the extraction process. Extraction with ether containing no $HNO_3$ results in the formation of a solid in the ether phase, presumably a hydroxy complex of uranium, during the extraction process which interferes mechanically with the extraction. The presence of $HNO_3$ in the ether prevents the formation of this solid. For the process of the present invention, it is desirable to contact the aqueous phase with an ether having approximately a 1 N $HNO_3$ concentration. This concentration of $HNO_3$ prevents the formation of this solid and in addition results in a favorable Mo/U extraction ratio. The most favorable results in the present process are obtained when the $HNO_3$ concentration of the feed solution is below approximately 0.2 N. Satisfactory results were obtained, however, with feed solutions having a $HNO_3$ concentration above 1 N.

The following examples illustrate but do not limit the invention.

EXAMPLE I

The solution containing uranium and molybdenum used in the present example was obtained by digestion of pitchblende ore. 95.5 pounds of an ore slurry containing 69.0% by weight (30 kg.) of dry ore assaying 61.9% in $U_3O_8$ on a dry basis was digested with 24.8 liters of 36° Bé. $HNO_3$. This amounts to 1.8 stoichiometric amounts of $HNO_3$ based upon the assumption that 7 moles of $HNO_3$ per mole of $U_3O_8$ are necessary for reaction.

The ore slurry was brought to a temperature of about 80° C. and the acid added over a period of approximately 20 minutes. 2.4 liters of 66° Bé. sulfuric acid were then added to the digestion mixture to precipitate the lead and radium values extracted from the ore by the digestion. This precipitate and undissolved material were removed by filtering and the filtrate containing the uranium and molybdenum values was treated with 7 kg. of $BaCO_3$ to remove any excess $SO_4^{-2}$ ion. Of the filtrate obtained after filtering off the $BaSO_4$, 6 gals. were heated to evaporate water from the solution until the boiling point of the solution reached 120° C.

The above concentration step or "boil down" serves to dehydrate some of the silica extracted from the ore and remove it from solution. Molybdenum forms a complex with silica, silicomolybdic acid, which like the phosphate complex is soluble in ether. Thus this "boil down" step decreases the amount of silica available to complex the molybdenum and hence tends to decrease the amount of molybdenum subsequently extracted by the ether.

The solution remaining after the boildown step was diluted to a volume of 3.7 gal. having an approximate $UO_2(NO_3)_2$ concentration of 0.42 gm./ml. 360 gm. of $Fe(NO_3)_3 \cdot 9H_2O$ were then added and the solution was saturated with approximately 5 kg. of $NaNO_3$ and filtered.

A portion of the filtrate from this last filtration step containing approximately 0.338 gm./ml. $UO_2(NO_3)_2$, 0.026 gm./ml. $Fe(NO_3)_3 \cdot 9H_2O$ and 2180 parts of molybdenum as $MoO_3$ per million parts of $UO_2(NO_3)_2$ and having a $HNO_3$ concentration of approximately 0.175 N was extracted with diethyl ether 1 N in respect to $HNO_3$. The ether extract phase contained 12 parts of $MoO_3$ per million parts of $UO_2(NO_3)_2$, which is substantially completely extracted from the aqueous phase. In a control test upon a solution similar in all respects except that no $Fe(NO_3)_3 \cdot 9H_2O$ was added the ratio of $MoO_3/UO_2(NO_3)_2$ in the extract phase increased to 41 parts per million.

The extraction in these tests was carried out in a packed column. The column was first filled with diethyl ether and the feed rates adjusted to a flow rate of 1 vloume of aqueous feed per 2 units of volume of diethyl ether. The runs were prolonged until three times the ether volume of the packed sections had been displaced by the incoming solvent.

EXAMPLE II

The solutions used in the present example were also obtained by $HNO_3$ digestion of pitchblende ore. 95.5 lbs. of an ore slurry identical in composition to that of Example I were digested with 18.0 liters of 36° Bé. $HNO_3$. This amounts to 1.3 stoichiometric amounts of $HNO_3$ based upon the assumption that 7 mols of $HNO_3$ per mole of $U_3O_8$ are necessary for reaction. The ore slurry was first brought to 70° C. and the acid added over a period of 20 minutes. Digestion was continued until $NO_2$ ceased coming off at which time the slurry temperature was approximately 100° C.

4.0 kg. of $Ba(NO_3)_2$ dissolved in 5 gal. of $H_2O$ were then added to the hot digestion solution. This amount of $Ba(NO_3)_2$ is based on a ratio of 400,000 parts of Ba to 1 part of the radium contained in the ore digested. This ratio is the assumed optimum for radium removal by a sulfate precipitation. To cause this sulfate precipitation 1.28 liters of 66° Bé. $H_2SO_4$ diluted with 1.3 liters of $H_2O$ were immediately added after the $Ba(NO_3)_2$ addition. The amount of $H_2SO_4$ added is stoichiometrically equivalent to the $Ba(NO_3)_2$ added and to the Pb content of the ore assayed at 6% PbO. The digestion was continued for 30 minutes. The solution was then cooled to 40–60° C. and filtered and washed.

The filtrate and washings were combined and diluted to 17.2 gal. to give a $UO_2(NO_3)_2$ concentration of approximately 0.4 gm./ml. of solution. This solution was then heated to boiling and 2.15 kg. of $BaCO_3$ added to assure complete removal of sulfate ions. After digestion for one hour the solution was filtered to remove the $BaSO_4$ and the filtrate again diluted to 17.2 gal.

The solution was then "boiled down" to 120° C., diluted, and the pH adjusted to 0.7 by the addition of $Na_2CO_3$. The final solution volume was 9.3 gal. with a computed $UO_2(NO_3)_2$ content of 0.74 gm./ml.

3.0 gal. of this solution were then diluted to 3.6 gal. and 342 gm. of $Fe(NO_3)_3 \cdot 9H_2O$ added. The solution was then saturated with $NaNO_3$ and filtered. The final solution contained 0.396 gm./ml. of $UO_2(NO_3)_2$, 0.025 gm./ml. of $Fe(NO_3)_3 \cdot 9H_2O$ and 2100 parts of $MoO_3$ per million parts of $UO_2(NO_3)_2$. The $HNO_3$ concentration was 0.043 N. This solution was extracted with diethyl ether 1 N in $HNO_3$ in the same manner as the previous example. The $MoO_3$ content of the extract was 15 parts $MoO_3$ per million parts of $UO_2(NO_3)_2$.

Another portion of the 9.3 gal. of solution containing 0.74 gm./ml. of $UO_2(NO_3)_2$ was treated similarly with the exception that no $Fe(NO_3)_3 \cdot 9H_2O$ was added prior to the extraction step. In this instance the ether extract contained 188 parts of $MoO_3$ per million parts of $UO_2(NO_3)_2$.

EXAMPLE III

The experiments outlined in this example illustrate further the beneficial effect of added ferric ion upon reducing the extraction ratio of Mo/U. The aqueous solutions upon which the extractions were carried out in these experiments were obtained by the digestion process outlined in Example I. The aqueous solutions for the present experiments were obtained from the solution remaining after the removal of the $BaSO_4$ precipitate. These solutions contained approximately 0.35 gm./ml. of $UO_2(NO_3)_2$ and 2700 parts of $MoO_3$ per million parts of $UO_2(NO_3)_2$. 50 ml. portions of this solution were treated with varying amounts of ferric nitrate and saturated with $NaNO_3$. 30 ml. portions of the saturated solutions were shaken with three 60 ml. portions of diethyl ether 1 N in $HNO_3$. The results of these experiments are shown in the following table.

Table I

| Solution No. | $Fe(NO_3)_3 \cdot 9H_2O$, gm./ml. | $UO_2(NO_3)_2$, gm./ml. | $MoO_3$ p.p.m. $UO_2(NO_3)_2$ in extract |
| --- | --- | --- | --- |
| 1 | 0.005 | 0.35 | 186 |
| 2 | 0.016 | 0.34 | 39 |
| 3 | 0.039 | 0.33 | 25 |
| 4 | 0.078 | 0.33 | 16 |
| 5 | 0.164 | 0.32 | 11 |
| 6 and 7 | 0 | 0.35 | 417 av. |

The great reduction in the ratio of the Mo/U extracted in the presence of even a very small concentration of $Fe^{+3}$ ion is demonstrated by the results from solution one where the presence of $Fe^{+3}$ reduced the $MoO_3/UO_2(NO_3)_2$ ratio by a factor of better than 2.2, and is demonstrated further in the subsequent tests where slight increases in $Fe^{+3}$ ion concentration reduced the ratio by even greater factors.

As the above examples illustrate, the addition of ferric ion to the aqueous phase decreases the extraction of molybdenum by the ether. The extraction of the molybdenum is assumed to be due to the formation of phosphomolybdic acid which is ether soluble whereas molybdenum values per se are not. The addition of the ferric ion is thought to cause the formation of a strong complex of ferric ion and phosphate ion thus preventing the formation of the ether-soluble phosphomolybdic complex.

Aside from the advantage of the process of the present invention in obtaining a product of higher purity is the elimination of operating difficulties caused by molybdenum in the extraction operation. The molybdenum in the high concentrations present without the use of ferric ion in the extraction process forms solids of some complex type which accumulate at the interfaces in the counter-current extractor. If the molybdenum is extracted into the ether it also forms solids during the stripping operation wherein the ether containing the uranyl nitrate is contacted with water to remove the uranium values therefrom. These solids result in mechanical interference in the extraction operations.

From the foregoing description, it will be apparent to those skilled in the art that the instant invention provides a practical, inexpensive and relatively simple method of obtaining uranium substantially free from molybdenum.

It is to be understood that all matter hereinbefore set forth is to be considered as illustrative and not in a limiting sense, and that the scope of the invention concept is limited only by the appended claims.

We claim:

1. A method of recovering uranium values from aqueous solutions containing uranium values and molybdenum values which comprises adding ferric ions to the solution, and thereafter extracting the uranium values by contacting the solution with a substantially water immiscible selective organic solvent.

2. A process for obtaining uranium values substantially free from molybdenum from aqueous solutions containing uranium values, molybdenum values, and phosphate ions which comprises incorporating ferric ions in the solution to complex the phosphate ions thus preventing the formation of organic solvent soluble phosphomolybdates, and thereafter contacting the solution with a substantially water immiscible organic solvent to extract the uranium values from the solution.

3. The process of claim 2 wherein the organic solvent is diethyl ether approximately 1 N in respect to $HNO_3$.

4. The process of claim 2 wherein $NaNO_3$ is added to the solution prior to contacting said solution with the organic solvent.

5. The process of claim 2 wherein $NaNO_3$ is added to the solution prior to contacting said solution with the organic solvent and said organic solvent is diethyl ether approximately 1 N in respect to $HNO_3$.

6. A process of obtaining uranium substantially free from molybdenum from an aqueous solution of uranyl nitrate containing in addition molybdenum values, phosphate ions and dissolved silica which comprises heating the solution to dehydrate a portion of the silica thereby removing it from the solution, and thereafter adding ferric nitrate to the solution and contacting said solution with diethyl ether to extract the uranyl nitrate therefrom.

7. A process of obtaining substantially pure uranyl nitrate from a pitchblende ore which in addition to $U_3O_8$ contains lead, radium, molybdenum, silicon and phosphorus values which comprises digesting said ore in aqueous solution of $HNO_3$, separating the dissolved lead and radium values from the solution obtained by the digestion by precipitating said lead and radium values as sulfates, filtering to separate said sulfates and undissolved ore values from said solution, adding sufficient barium ions to precipitate any sulfate ions remaining in the solutions and thereafter removing the precipitate of $BaSO_4$ from the solution, evaporating said solution by heating to dehydrate at least a portion of the silicon values contained therein, adding ferric ions to said solution together with a salting out agent and contacting said solution with diethyl ether to extract the uranyl nitrate therefrom.

8. A process of obtaining uranyl nitrate substantially free from molybdenum from an aqueous solution of uranyl nitrate which also contains dissolved molybdenum values and phosphate ions which comprises adding ferric nitrate to said aqueous solution of uranyl nitrate in order to complex said phosphate ions and then extracting uranyl nitrate from said aqueous solution with diethyl ether.

References Cited in the file of this patent

UNITED STATES PATENTS 2,227,833   Hixson et al. _____ Jan. 7, 1941

OTHER REFERENCES

Misciatelli: Chemical Abstracts, vol. 23, page 1554 (1929).